March 19, 1957     H. T. STEVINSON     2,785,775
MOTION ARRESTER

Filed May 20, 1955     2 Sheets-Sheet 1

March 19, 1957  H. T. STEVINSON  2,785,775
MOTION ARRESTER

Filed May 20, 1955  2 Sheets-Sheet 2 though at the expense of some addition in the complication of manufacture, a true spiral form of groove may be used that will give an exactly constant retarding force. It will be understood that, for a force to be constant

United States Patent Office
2,785,775
Patented Mar. 19, 1957

2,785,775

MOTION ARRESTER

Harry T. Stevinson, Ottawa, Ontario, Canada, assignor to National Research Council, Ottawa, Ontario, Canada, a body corporate Application May 20, 1955, Serial No. 509,895

5 Claims. (Cl. 188—101)

This invention relates to a device for use as a motion arrester, that is to say a device that may be used to apply a retarding force to a moving article to bring it to rest or to tend to bring it to rest.

When a moving article is of a fragile nature, it is desirable that its deceleration should be as uniform, or at least as smoothly varying, as possible. An ideal motion arrester would thus be one that provides an exactly constant or otherwise precisely controlled retarding force, and yet, unlike elastic devices such as springs, includes no rebound characteristics after an article has been brought to rest.

In my co-pending United States patent application of even date Serial No. 509,896, there is described a cylindrical shock absorber that has been designed especially for use as a crash head in dropping supplies from aircraft. The container in which the supplies are housed is formed as a continuation of the cylindrical body of the shock absorber, and these two parts are normally connected together at their end peripheries in a manner sufficiently secure to maintain the assembly together during flight. On landing, however, there is often a considerable component of forward horizontal motion as well as downward motion, due either to wind, the forward motion of the aircraft if the supplies have been dropped from a low altitude, or the drag of a parachute. The crash head will normally sink slightly into the ground, unless the ground is very hard, and in any event it is intended that this crash head should form an anchor for the container housing the supplies which container will become detached from the crash head and continue to move horizontally along the ground for some distance.

The motion arrester of the present invention has been developed particularly for use as a means of connecting such a crash head to a supply container, although, as will be apparent, the arrester will be applicable to any set of circumstances in which a controlled retarding force is called for. It is envisaged, for example, that the arrester may well find important application as a safety device for retarding (without necessarily ever bringing completely to rest) the motion of a falling body. Combined with a suitable harness, a device of this type may even be suitable for keeping within safe limits the falling speed of personnel escaping from high places, such as burning buildings. Similarly the device may have applications in the field of mountaineering and other sports or occupations which involve a danger of falling.

The invention consists of a sheet of material (normally a metal, such as steel) scored by a continuous smoothly curved groove extending in regularly mutually spaced convolutions, the depth of said groove in relation to the thickness and properties of the material being such as to enable a continuous ribbon to be torn from the sheet by a tensile force supportable by said ribbon.

The sheet of material may be flat with the groove in spiral form, or it may be cylindrical, in which case the groove will be a helix, or the sheet may be of some intermediate shape such as that of a truncated cone.

The invention is illustrated by way of example in the accompanying drawings, in which.

Figure 1:
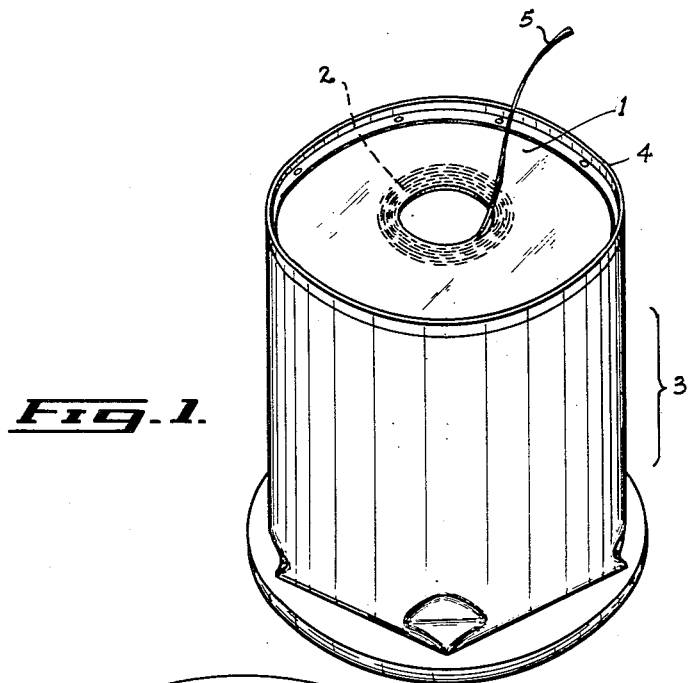
Figure 1 shows a perspective view of a first form of arrester according to the invention, mounted in a shock absorber for use as a crash head.
Figure 2:
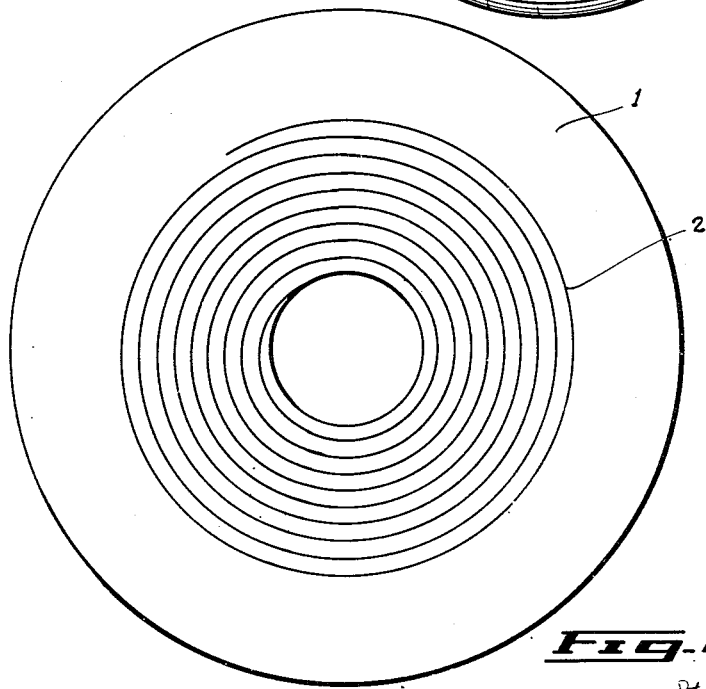
Figure 2 shows an enlarged underside plan view of the arrester device alone.
Figure 3:
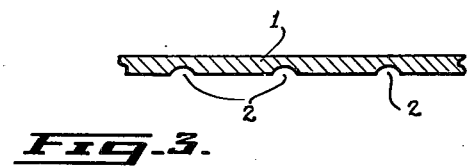
Figure 3 shows a fragmentary sectionary view of this arrester on a much enlarged scale.

Referring firstly to Figures 1 to 3, the arrester there illustrated consists of a disc 1 of steel, one surface of which has been deeply scored with a spirally extending groove 2. Figure 3 shows the depth of the convolutions formed by this groove 2. The exact cross-sectional shape of the groove is not important, but may conveniently be semi-circular as in the example shown. Alternatively, a V-shaped or rectangular groove may be used. In its application to a shock absorber of the type described in said co-pending application, and shown generally at 3 in Figure 1 without further detailed description, the disc 1 is mounted at the rear end of the cylindrical shock absorber with the groove facing inwardly towards the interior thereof. This rear end of the shock absorber is the end to which the container (not shown) housing the supplies is detachably connected, such connection being established by means of a flange 4 and other suitable securing means (not shown). Before mounting the supply container on the shock absorber, the inner end of the thin section of the disc 1 defined between successive turns of the groove 2 is pulled away from its adjacent metal to form the beginning of a ribbon 5, in the manner seen in Figure 1. This end of the ribbon 5 is then firmly connected to a suitable part of the supply container. When the supply container becomes dislodged from the shock absorber and continues to travel along the ground, these parts will remain connected only by the ribbon 5. There will be considerable tension in this ribbon, and this force will act to tear more and more ribbon away from the parent metal. The nature of this tearing action is such that the force which is necessary to tear each successive coil of the ribbon 5 away from the parent disc 1, remains within certain comparatively close limits. This force is quite large and almost constant over a large range of spiral radius and tearing speed, although it is slightly greater near the centre of the spiral where the radius is less, and decreases slightly at slow tearing speeds, i. e. below 1 foot per second, showing a total decrease of about 5% at a near zero rate.

It will normally be necessary for the groove to remove at least approximately 60% of the thickness of the metal. That is to say, the thickness of metal that will remain to be torn at the root of each groove will normally not be greater than 40% of the full thickness of the disc and thus the thickness of the ribbon. The maximum value that the thickness of the metal torn can attain will vary with the class of steel employed, but there will be a limiting thickness for each metal above which tearing away as a ribbon will not occur. Moreover, it will normally be necessary for the groove to be on the opposite side of the sheet to that from which the ribbon is pulled. That is to say the ribbon will be pulled away from the upgrooved side.

Figure 4:
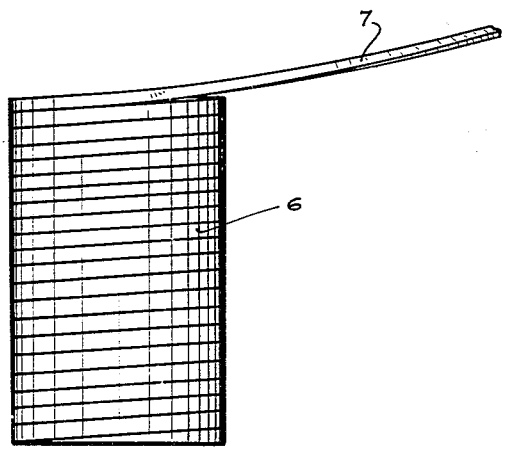
Figure 4 shows a side elevation of a second form of arrester according to the invention.
Figure 5:
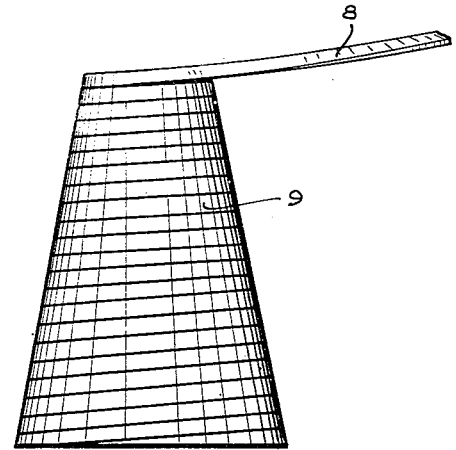
Figure 5 shows a side elevation of a third form of arrester according to the invention.

In many applications, the slight lack of uniformity of retarding force consequent upon the spiral shape of the arrester illustrated in Figures 1 and 2 will not be unacceptable, and the convenient flat shape of the spiral form of the device will be of overriding advantage. If, however, extreme uniformity of retarding force is required for some reason, the construction shown in Figure 4 may be adopted. This figure shows a cylinder of metal 6 scored with a helical groove which is generally similar to that shown in Figure 3 in that it enables a ribbon 7 of metal to be torn away from the body of the cylinder. The cylinder 6 may be scored on either the inside or the outside, but the inside will be preferred, since the ribbon 7 will normally be torn away generally tangentially. For this purpose the cylinder 6 may conveniently be mounted to turn freely on a mandrel. A further form that the device may take is shown in Figure 5 where a ribbon 8 is torn away from a body of metal 9 which is in the form of a truncated cone.

When metal is used, this will normally be steel, since no other cheaply available metal exhibits so well the desired properties of strength, combined with sufficient ductility to allow sharp bending of the ribbon, and the ability to shear cleanly along the groove.

For some applications, a material other than a metal may be used, for example one of the tougher synthetic materials such as nylon or Teflon. It is, of course, particularly important to have uniformity of quality throughout the whole body of the material.

A valuable feature of a motion arrester constructed in accordance with the present invention, is the facility with which the retarding force may be varied at will. If it is not required to maintain the force constant, but instead gradually to increase or decrease it, then the groove need simply be made progressively shallower or deeper in accordance with the characteristics desired.

I claim:

1. A motion arrester comprising a sheet of material scored by a continuous smoothly curved groove extending in regularly mutually spaced generally coaxial convolutions, the depth of said groove in relation to the thickness and properties of the material being such as to enable a continuous ribbon to be torn from the sheet by a tensile force supportable by said ribbon, the material beneath a length of said groove at one end thereof being ruptured to provide a starting portion of said ribbon.

2. A motion arrester comprising a flat sheet of material scored by a continuous generally spiral groove extending outwardly from an aperture in said sheet in regularly mutually spaced convolutions, the depth of said groove in relation to the thickness and properties of the material being such as to enable a continuous ribbon to be torn from the sheet by a tensile force supportable by said ribbon, the material beneath a length of said groove at one end thereof being ruptured to provide a starting portion of said ribbon.

3. A motion arrester comprising a cylindrical sheet of material scored by a continuous helical groove extending in regularly mutually spaced convolutions, the depth of said groove in relation to the thickness and properties of the material being such as to enable a continuous ribbon to be torn from the sheet by a tensile force supportable by said ribbon, the material beneath a length of said groove at one end thereof being ruptured to provide a starting portion of said ribbon.

4. A motion arrester comprising a sheet of material in the form of a truncated cone scored by a continuous groove extending in a generally spiral helix in regularly mutually spaced convolutions, the depth of said groove in relation to the thickness and properties of the material being such as to enable a continuous ribbon to be torn from the sheet by a tensile force supportable by said ribbon, the material beneath a length of said groove at one end thereof being ruptured to provide a starting portion of said ribbon.

5. A method of inhibiting relative movement between a pair of relatively movable bodies, comprising securing to one of said bodies a sheet of material scored by a continuous smoothly curved groove extending in regularly mutually spaced convolutions and securing to the other of said bodies a portion of said sheet defined by an adjacent pair of said convolutions, the depth of said groove in relation to the thickness and properties of the material being such that sustained relative movement apart of said bodies will be effective to tear a continuous ribbon from said sheet.

References Cited in the file of this patent

UNITED STATES PATENTS

| | | |
|---|---|---|
| 554,131 | Mavis | Feb. 4, 1896 |
| 1,860,375 | Winterer et al. | May 31, 1932 |
| 2,063,745 | Kucher | Dec. 8, 1936 |
| 2,161,820 | Kessenich | June 13, 1939 |
| 2,417,676 | Chernack | Mar. 18, 1947 |
| 2,483,655 | Schultz | Oct. 4, 1949 |